(12) United States Patent
Hall et al.

(10) Patent No.: US 9,458,333 B2
(45) Date of Patent: Oct. 4, 2016

(54) HIGH ELONGATION THERMOFORMING INK-JET INK

(75) Inventors: Stephen Anthony Hall, Somerset (GB); Andrew David Speirs, Wiltshire (GB); Stephen Paul Wilson, Somerset (GB)

(73) Assignee: Sun Chemical B.V., Weesp (NL)

( * ) Notice: Subject to any disclaimer, the term of this patent is extended or adjusted under 35 U.S.C. 154(b) by 123 days.

(21) Appl. No.: 13/259,566

(22) PCT Filed: Apr. 26, 2010

(86) PCT No.: PCT/GB2010/050676
§ 371 (c)(1),
(2), (4) Date: Nov. 28, 2011

(87) PCT Pub. No.: WO2010/125373
PCT Pub. Date: Nov. 4, 2010

(65) Prior Publication Data
US 2012/0129972 A1     May 24, 2012

Related U.S. Application Data

(60) Provisional application No. 61/172,867, filed on Apr. 27, 2009.

(51) Int. Cl.
*C09D 11/101*     (2014.01)
*C08G 18/67*      (2006.01)
(Continued)

(52) U.S. Cl.
CPC ........... *C09D 11/101* (2013.01); *C08G 18/672* (2013.01); *C09D 11/30* (2013.01); *C09D 175/16* (2013.01); *C08G 18/6725* (2013.01); *C08G 18/702* (2013.01)

(58) Field of Classification Search
CPC ............ C08G 18/672; C08G 18/6725; C08G 18/702; C09D 175/16
USPC .......... 522/71, 74, 90, 95, 96, 174; 427/510, 427/511, 514, 508; 428/32.1, 32.26
See application file for complete search history.

(56) References Cited

U.S. PATENT DOCUMENTS 7,763,670 B2 *  7/2010  Kessel et al. ............... 522/97
7,825,168 B2   11/2010  Nakamura (Continued)

FOREIGN PATENT DOCUMENTS

FR    2828203        2/2003
JP    2007077211 A   3/2007

(Continued)

OTHER PUBLICATIONS

Office Action issued Mar. 31, 2014 in connection with Japanese Patent Application No. 2012-506586.

(Continued)

*Primary Examiner* — Michael L Leonard
(74) *Attorney, Agent, or Firm* — Charles C. Achkar; Ostrolenk Faber LLP

(57) ABSTRACT

An energy-curable ink or coating composition comprising: a monofunctional urethane monomer, such as a monofunctional urethane acrylate monomer; a monofunctional monomer; and, optionally, a colorant, photoinitiator, stabilizer, surfactant and/or a vinyl resin, for use as a thermoforming ink or coating that, when printed onto a substrate (1), elongates on thermoformation of the substrate (3) to adopt the shape of a mold (2), a method of printing on a thermoforming substrate using such an ink or coating and a printed thermoformed article (4).

17 Claims, 1 Drawing Sheet

(51) Int. Cl.
  *C09D 175/16* (2006.01)
  *C09D 11/30* (2014.01)
  *C08G 18/70* (2006.01)

(56) References Cited

U.S. PATENT DOCUMENTS

| | | | |
|---|---|---|---|
| 8,105,679 | B2 | 1/2012 | Jonai et al. |
| 2004/0152799 | A1 | 8/2004 | Miller et al. |
| 2007/0060665 | A1* | 3/2007 | Nakamura ................... 522/178 |
| 2008/0090930 | A1* | 4/2008 | Madhusoodhanan et al. . 522/83 |
| 2008/0090931 | A1* | 4/2008 | Nagvekar et al. ............ 522/114 |
| 2008/0108760 | A1* | 5/2008 | Mano et al. .................. 525/455 |

FOREIGN PATENT DOCUMENTS

| | | |
|---|---|---|
| WO | 0250186 A1 | 6/2002 |
| WO | 2007013368 A1 | 2/2007 |
| WO | WO 2007/062131 | 5/2007 |
| WO | WO 2008/045517 | 4/2008 |

OTHER PUBLICATIONS

Office Action issued Nov. 4, 2013 in connection with European Patent Application No. 10718663.7.
Office Action issued Apr. 10, 2014 in connection with European Patent Application No. 10718663.7.

* cited by examiner

HIGH ELONGATION THERMOFORMING INK-JET INK

This application is a 35 U.S.C. §371 National Stage Entry of International Application No. PCT/GB2010/050676, filed Apr. 26, 2010, which claims priority to U.S. Provisional Application No. 61/172,867, filed Apr. 27, 2009, both of which hereby are incorporated by reference in their entirety for all purposes as if fully set forth herein.

FIELD OF THE INVENTION

The present invention relates to inks and coatings, in particular ink-jet inks and coatings, for use as thermoforming inks and coatings for printing onto substrates that undergoing thermoforming processes.

BACKGROUND

Thermoforming processes typically involve vacuum forming, heat bending or folding an ink on a plastic substrate into a three-dimensional object. The temperature of the ink on the substrate is estimated to be between 60-180° C. During the thermoforming process, the ink image continuously elongates at the same rate as the plastic substrate to produce a three-dimensional product with digitally printed graphics. The printed ink image must be uniform and without cracking after the thermoforming process. US 2007/0084372 provides a general introduction to thermoforming inks. A typical thermoforming process is described in more detail below:

1) Thermoform inks are jetted onto a flat substrate and then cured with UV at an energy level of typically about 150 mJ/cm$^2$ or EB radiation from about 15 kGy with an accelerating voltage of 100 kV.
2) The substrate is put in an oven for between 20-25 seconds at a distance of 20 cm from the IR lamps. The lamps are set at a temperature of 700° C.
3) The substrate will soften under the heat from the IR lamps and after about 25 seconds a substrate molding pattern (see FIGS. 1 and 2) comes from under the substrate and deforms it.
4) After about 40 seconds the substrate molding pattern is retracted and a jet of air is applied to cool the substrate down. The thermoforming process is then complete.

Ink-jet imaging techniques have become very popular in commercial and consumer applications. Ink-jet printers typically operate by ejecting ink onto a receiving substrate in controlled patterns of closely spaced ink droplets. By selectively regulating the pattern of ink droplets, ink-jet printers can produce a wide variety of printed features, including text, graphics, images, holograms, and the like. The present invention relates, in particular, to ink-jet inks for use as thermoforming inks that are printed onto substrates that undergoing thermoforming processes.

Thermal ink-jet printers and piezo ink-jet printers are the two main types of ink-jet systems in widespread use today. For both approaches, inks must meet stringent performance requirements in order for the inks to be appropriately jettable and for the resultant printed features to have the desired mechanical, chemical, visual, and durability characteristics.

Solvent-based and water-based jettable inks are well known. A typical water-based ink generally comprises water, a colorant, which may be a dye and/or a pigment, one or more co-solvents, and one or more additives that are included to enhance the performance of the ink. Representative examples of such additives include one or more colorants, slip modifiers, thixotropic agents, foaming agents, antifoaming agents, flow or other rheology control agents, waxes, oils, plasticizers, binders, antioxidants, fungicides, bactericides, organic and/or inorganic filler particles, leveling agents, opacifiers, antistatic agents, dispersants, and the like. Solvent-based inks include relatively volatile organic solvents. Such inks typically dry more rapidly than aqueous inks. However, such solvents may be toxic, flammable, or the like, requiring careful handling. In addition, the solvent-based inks also tend to be compatible with only a limited range of substrates.

In order to avoid using a conventional solvent, inks incorporating a polymerizable diluent have been developed. The diluent tends to function as a viscosity reducer and as a binder when cured. In the uncured state, the inks have a low viscosity and are readily jetted. However, the polymerizable diluents readily cross-link upon exposure to a suitable source of curing energy, for example ultraviolet light, electron beam energy, and/or the like, to form a cross-linked polymer network. Such inks are commonly referred to as "energy-curable" inks to distinguish them from conventional "solvent-based" inks.

Ink-jet inks are typically limited to digitally printing onto flat sheet constructions, such as papers, plastics, banner materials and the like. For three-dimensional plastic constructions, screen printing was the preferred method since digital printing of ink-jet inks onto plastic substrates produced images that cracked or could not elongate under thermal forming conditions. Therefore, there is a need to be able to digitally print directly onto plastic substrates using ink-jet printing systems to form ink images capable of continual elongation during thermal processing.

US 2006/0222831 describes a curable ink-let ink comprising mono-functional monomers, a solvent, a pigment and a diluent which is capable of adhering to plastic substrates. The ink gives continuous elongation of 100-900% during thermoforming of the substrate. Optional use of difunctional Monomers of 10,000 g/mole or more and also the use of acrylic polymers is cited in the examples.

US 2006/0275588 (Polymeric Imaging) and also WO 2007/089252 describe ink-jet ink compositions comprising a pigment, diluents, mono functional monomers and an acrylic co-polymer or polymer with an acid number of below 20 mgKOH/g. The inks can be used as a high elongation vacuum formable ink with elongation 100-900%.

US 2007/0084372 (Polymeric Imaging) describes ink compositions for a thermoforming ink with an elongation of 100-900% comprising pigment, diluents, mono functional monomers and acrylic co-polymer or polymer with molecular weights between 2500-25000 g/mol. Solvent is not used. Similarly, WO 2008/004002 (Sericol) describes the use of passive resins in thermoforming inks. Ink compositions described consist of radiation curable monomers, one or more passive resins, one or more photoinitiator and one or more coloring aids. The passive resin is present at an amount of between 2-15% and has a molecular weight 1,500-70000.

The ink-jet inks of the prior art have been found to suffer from problems with open time and/or sustainability such that they are not particularly suited for use in ink-jet printing techniques in which the nozzles of the ink-jet printer remain open between printing operations. Many known inks suffer from an unacceptably rapid increase in viscosity on being exposed to the atmosphere in a print nozzle that leads to blocking of the nozzle or poor print performance on start up. Furthermore, inks including passive resins can cause problems with jetting. Another disadvantage of many known inks is an unacceptable level of tack after cure and/or incomplete curing.

Prior art thermoformable UV-curing ink-jet inks suffer from two major problems: poor printhead start-up performance and poor printing sustainability (reliability) at higher jetting frequencies. The poor start-up performance is caused by the use of solvents or volatile UV-curing monomers in the formulation. The poor sustainability is caused by the inclusion of higher molecular weight passive resin. Passive resins are resins that are inert resins, especially inert thermoplastic resins, that do not react with the polymerisable diluent monomers during curing of the ink are known in the art. A passive resin is substantially free of functional groups which polymerise under the curing conditions to which the ink is exposed. For example, a passive resin for use in an ink that is curable in a free radical polymerisation process is a resin that is free of ethylenically unsaturated groups or other groups that participate in free radical curing reactions. Passive resins include thermoplastic acrylic resins that have a weight average molecular weight of from 1500 to 70000. They are typically included in ink formulations to reduce the degree of cross-linking required to achieve a cured film by replacing the reactive monomers and/or polymerisable diluents in an ink.

SUMMARY OF THE INVENTION

In a first aspect of the invention, there is provided an energy-curable thermoforming ink or coating comprising a monofunctional urethane monomer and a further monofunctional monomer, wherein the level of multifunctional monomers present is less than 1 wt %. In a second aspect of the invention, there is provided an energy-curable ink comprising a monofunctional urethane acrylate, a monofunctional monomer and a pigment or dye, wherein the level of multifunctional acrylates present is less than 1 wt %, or more preferably less than 0.5 wt %. The energy-curable inks of the second aspect invention that comprise a monofunctional urethane acrylate and a further monofunctional monomer are advantageously thermoforming inks that are suitable for use with a thermoforming polymer substrate. The inks and coatings of the invention, that is the inks and coatings of the first aspect of the invention and the inks of the second aspect of the invention, are advantageously suitable for use in an ink-jet printing process. Advantageously, the viscosity of the inks or coatings of the invention are suitable for use in ink-jet printing. Preferably, the viscosity of the inks or coatings of the invention is less than 25 mPas at 50° C. and more preferably less than 20 mPas at 50° C. Advantageously, the inks or coatings of the invention have a low volatility. It has been found that, in some embodiments, a cured layer of an ink or coating of the invention is capable of an extension of at least 300% without cracking. Thus, the inks or coatings of the invention are advantageously suitable for application to a thermoforming substrate which is then shaped such that the surface of the substrate is extended by up to 300% or more.

In a third aspect, the invention provides a method of producing a three-dimensional printed article comprising the steps of applying the ink or coating of the first or second aspect of the invention onto a substantially flat substrate, for example by an ink-jet printing technique; exposing the printed ink or coating to actinic radiation to form a cured film; heating the substrate to a temperature above the glass transition temperature to soften the substrate; deforming the substrate to produce a shaped article; and cooling the substrate to below the glass transition temperature.

In a fourth aspect the invention provides a three-dimensional printed article comprising a cured layer of the ink or coating of the first or second aspects of the invention and/or produced according to the method of the third aspect of the invention.

Inks and coatings of the present invention have been found to exhibit improved reliability and productivity of printing. Furthermore, it has been found that the inks and coatings of the invention may be formulated to achieve low viscosities whilst avoiding the use any solvent and/or the use of highly volatile monofunctional monomers. Avoiding the above gives a combination of desirable extensional properties and advantageous jetting properties such as open time & sustainability.

The inks and coatings of the invention have been found to overcome the difficulties of obtaining good elongation with good jetting performance. Without wishing to be bound by any theory, it is postulated that this is due to the low viscosity and low volatility of the inks and coatings that do not include high levels of multifunctional monomers. Furthermore, the inclusion of monofunctional urethane monomers, such as monofunctional urethane acrylates, has been found to provide an ink or coating which results in a relatively hard film once cured. The level of multifunctional monomers, including multifunctional acrylates, is preferably kept below about 1 weight percent (wt %) or more preferably below about 0.5 wt %. Keeping the level of multifunctional acrylates below about 1 wt %, or more preferably below about 0.5 wt %, has been found to give very good elongation. Optionally, vinyl resins may be included in the inks and coatings of the invention to improve the percent stretch. It has been found that vinyl resins can be included in some embodiments of the ink or coating without compromising other performance properties. Using acrylic resins as passive resins in ink and coating formulations helps reduce the tack and improves adhesion but can give problems with sustainability. This may be due to the resin effecting the rheology of the ink. Inclusion of significant levels of solvents in an ink-let ink formulation has been found to reduce the open time of the ink or coating as the loss of such components at the nozzle may cause blocking of the nozzle. No problems like this have been found to typically occur when using monofunctional urethane monomers.

Markets that are currently using this thermoforming ink technology are the automotive industry for door panels, consoles etc., the electronics industry for mobile phones etc. and in point-of-sale display signs. But it is understood that the inks and coatings of the present invention could be utilized in any area where thermoformable UV-curing inkjet inks and coatings are used.

DETAILED DESCRIPTION OF THE INVENTION

Figure 1:
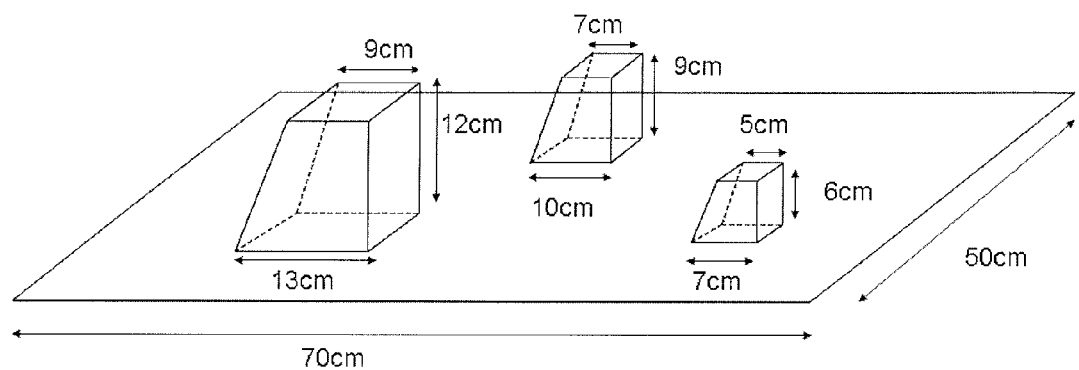
FIG. 1 shows a typical mould for thermoforming a substrate.

The ink or coating of the present invention is advantageously suitable for use in a thermoforming process. In particular, the ink or coating of the first aspect of the invention and/or the ink of the second aspect of the invention is advantageously suitable for printing onto substrates that are then shaped using a thermoforming process in which the cured ink or coating on the substrate is exposed to temperatures estimated to be between 60 and 180° C. The ink or coating of the present invention is advantageously capable of withstanding these changes without any thermal degradation. The ink or coating of the invention is advantageously capable of withstanding temperatures of at least about 180° C., once cured, without undergoing thermal degradation. In one embodiment, the ink or coating is capable of withstanding temperatures of at least about 200° C., for example at least 220° C., once cured, without undergoing thermal degradation. Advantageously, the ink or coating of the invention can undergo elongation of at least about 200%, for example at least about 250% and especially at least about 300% when cured. In some embodiments, a cured image of an ink or coating of the invention may be elongated by more than about 300% when cured, for example at least about 400%, such as at least about 450%. Some embodiments of inks or coatings of the invention may, for example, be extended by about 900%.

The ink or coating of the invention comprises monofunctional urethane monomers that include one functional group that is capable of participating in a curing reaction and also at least one urethane functional group. The term "urethane" refers to a group of the formula —NH—CO—O—, also known as a carbamate group. Said functional group that is capable of participating in a curing reaction is preferably a functional group that is reacts in a free radical curing reaction, such as an ethylenically unsaturated functional group, for example a vinyl or acrylate functional group. Preferred, monofunctional urethane monomers include monofunctional urethane acrylate monomers and monofunctional urethane vinyl monomers, especially monofunctional urethane acrylate monomers. It has been found that the ink or coating of the present invention which includes monofunctional urethane monomer(s) advantageously display both good open times and sustainability coupled with excellent elongation and low viscosity for grayscale print heads.

It has been found that the inks and coatings of the invention may be formulated to achieve acceptable open time properties. It has been found that an ink or coating that is formulated such that it has a relatively low volatility typically has acceptable open time properties. For example by selecting monofunctional monomers that result in an ink having a low volatility, an ink or coating having an acceptable open time may be achieved. Advantageously, about a 10 g sample of an ink or coating of the invention has a weight loss of no more than about 8%, after standing in a ventilated oven for about 4 hours at about 50° C. in an open flat bottomed dish having a diameter of about 55 mm. The inks and coatings of the invention advantageously have a low volatility. A low volatility ink or coating may be defined, for example, as an ink or coating for which about a 10 g sample of said ink or coating has a weight loss of less than about 5% after standing in a ventilated oven for about 4 hours at about 50° C. in an open flat bottomed dish having a diameter of about 55 mm. Advantageously, about a 10 g sample of an ink or coating of the invention has a weight loss of less than about 4%, for example less than about 2%, under the same conditions.

In addition, it has been found that the inks of the invention display good adhesion on a range of common thermoforming substrates such as Polystyrol™, Forex Classic™, Plexiglas XT™ and Lexan™.

The inks and coatings of the invention are advantageously curable using a free radical-curing mechanism. The inks and coatings of the invention optionally include a free radical photoinitiator.

The level of multifunctional monomers present in the ink or coating of the invention is less than about 1 weight percent (wt %), for example, less than 1.0 wt %. Preferably, the level of multifunctional monomers present in the ink or coating of the invention is less than about 0.5 wt %. A multifunctional monomer is a compound comprising more than one functional group that is capable of participating in the curing reaction, for example a polymerisation reaction, during curing of the ink or coating. In particular, the multifunctional monomer includes more than one functional group that reacts in a free radical curing reaction, such as an ethylenically unsaturated functional group, for example a vinyl or acrylate functional group. It has been found that minimizing the level of multifunctional monomers in the ink or coating formulation, and in particular minimizing the level of multifunctional acrylates present, provides an ink or coating that, when cured, has a good elongation. Preferably, the level of multifunctional acrylates present in the ink or coating of the invention is less than about 0.4 wt %. Advantageously, the ink or coating advantageously comprises no more than about 0.3 wt % multifunctional monomers. Advantageously, the ink or coating is substantially free of multifunctional monomers and, for example, comprises no more than about 0.2 wt % multifunctional monomers and especially no more than about 0.1 wt % multifunctional monomers. Advantageously, the ink advantageously comprises no more than 0.3 wt % multifunctional acrylates. Advantageously, the ink or coating is substantially free of multifunctional acrylates and, for example, comprises no more than about 0.2 wt % multifunctional acrylates and especially no more than about 0.1 wt % multifunctional acrylates. Although it is possible to exclude multifunctional monomers, including multifunctional acrylate monomers altogether, low level of multifunctional monomer, such as levels of less than about 1.0 wt %, may be tolerated, for example as a minor impurity in a monofunctional acrylate, without having a detrimental effect on the properties of the thermoforming inks and coatings of the invention. Some commercially available monofunctional monomers and, in particular, some of the commercially available monofunctional acrylate monomers, include multifunctional monomers as impurities, for example at levels of up to about 5 wt %. Any multifunctional monomers, including multifunctional acrylates, present as impurities in monofunctional monomers used in the ink or coating formulation are to be counted towards the total content of multifunctional monomers present in the ink or coating formulation.

Optionally, the ink or coating of the invention comprises a resin or a mixture of resins, especially a vinyl resin. In one embodiment, the inks or coatings of the invention include at least about 0.05 wt % vinyl resin, for example at least about 0.1 wt % vinyl resin, especially at least about 0.5 wt % vinyl resin. In some embodiments, the inks or coatings of the invention comprise at least about 1 wt % vinyl resin. Preferably, the ink or coating of the invention comprises no more than about 15 wt % vinyl resin, for example no more than 12 wt % vinyl resin and especially no more than about 10 wt % vinyl resin. In some embodiments, the ink or coating of the invention comprises no more than about 8 wt % vinyl resin, for example no more than about 5 wt % vinyl resin, especially no more than about 4 wt % vinyl resin. In one embodiment, the ink or coating comprises from about 0.1 to about 10 wt % vinyl resin, for example, from about 0.5 to about 8 wt % vinyl resin, especially from about 1 to about 4 wt % vinyl resin. Alternatively, the ink or coating of the invention is substantially free of resins, including vinyl resins. Optionally, the ink or coating of the invention include no more than about 3 wt % vinyl resin, for example less than about 2 wt % vinyl resin, especially no more than about 1 wt % vinyl resin. In one embodiment, the ink or coating of the invention comprises no more than about 0.5 wt % vinyl resin, for example, no more than about 0.1 wt % vinyl resin, especially no more than about 0.05 wt % vinyl resin and, in particular, no more than about 0.01 wt % vinyl resin.

Advantageously, the ink or coating of invention have a viscosity of no more than about 25 mPas at about 50° C., especially no more than about 20 mPas at about 50° C., for example no more than about 15 mPas at about 50° C. The ink or coating may, for example, have a viscosity of at least about 1 mPas at about 50° C., for example a viscosity of at least about 3 mPas at about 50° C., especially at least about 5 mPas at about 50° C. The ink or coating of the first aspect of the invention is advantageously suitable for use in ink-jet printing. Ink-jet inks and coatings typically have a viscosity in the range of from about 5 to about 20 mPas at about 50° C., for example from about 7 to about 15 mPas at about 50° C., especially from about 8 to about 12 mPas at about 50° C.

The ink or coating of the invention is an energy-curable ink or coating composition. Energy-curable inks and coatings are preferably substantially free from solvents, including water and volatile organic solvents. For example, the ink or coating of the invention typically comprises no more than about 3 wt % solvent, especially no more than about 2 wt % solvent. In some embodiments, the ink of the invention comprise no more than about 1 wt % solvent, especially no more than about 0.5 wt % solvent.

The ink or coating of the invention typically comprises no more than about 5 wt % passive resins, for example, no more than about 2 wt % passive resins, especially no more than about 1.5 wt % passive resins. In some embodiments, the ink or coating of the invention comprise no more than about 1 wt % passive resins, especially no more than about 0.5 wt % passive resins. In a further embodiment, the ink or coating of the invention comprises a total of no more than about 2 wt % resin, including passive resins, such as passive acrylate resins, and vinyl resins, for example a total of no more than about 1 wt % resins and especially a total of no more than about 0.5 wt % resins.

In one embodiment, the ink or coating of the invention is an ink. The ink advantageously comprises colorant, for example a pigment or dye. In an alternative embodiment, the ink or coating of the first aspect of the invention is a coating, for example, a varnish. The coating may, optionally, be a clear, colourless coating, that does not include a colorant or may, alternatively, be a coloured coating, for example a clear, coloured coating.

Advantageously, the ink or coating of the invention comprises at least about 15 wt % monofunctional urethane monomer, for example at least about 20 wt % monofunctional urethane monomer and especially at least about 25 wt % monofunctional urethane monomer. The ink or coating may comprise more than one monofunctional urethane monomer. Advantageously, and in addition to the monofunctional urethane monomer(s), the ink or coating of the invention includes a monofunctional monomer that is curable in a free radical curing reaction. The further monofunctional monomer typically functions as a polymerizable diluent, decreases the viscosity of the ink or coating and/or increases the glass transition temperature ($T_g$) of the ink or coating. The ink or coating of the invention may include more than one further monofunctional monomer. Advantageously, the ink or coating of the invention comprises at least about 15 wt % further monofunctional monomer(s), that is one or more monofunctional monomers in addition to the monofunctional urethane monomer(s). For example, the ink or coating may comprise at least about 25 wt % further monofunctional monomer(s), especially at least about 35 wt %. In one embodiment, the ink or coating of the invention comprises at least about 40 wt % further monofunctional monomer(s), for example at least about 45 wt % further monofunctional monomer(s). Advantageously, the ink or coating of the invention comprises a total of at least about 60 wt % monofunctional monomers. Total monofunctional monomers include both the monofunctional urethane monomer(s) and the further monofunctional monomer(s). The term "monofunctional monomer" as used herein refers to a monomer having only one functional group which takes part in a curing reaction.

The energy-curable ink or coating of the invention optionally further comprises a stabilizer.

Substrate Molding Pattern

Figure 2:
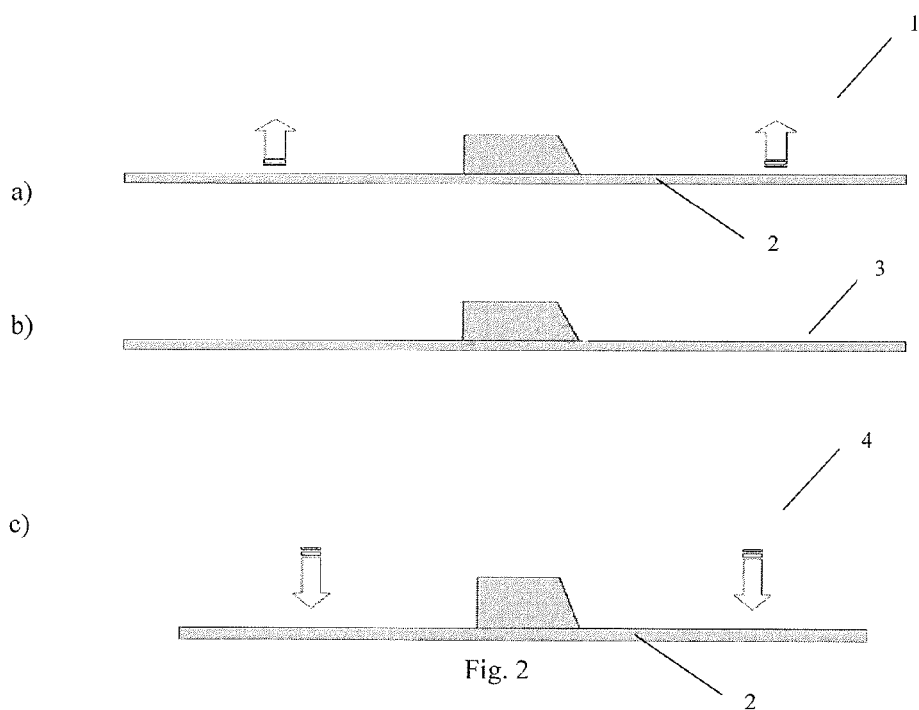
FIG. 2 shows the thermoforming process.

A typical mould with the dimensions shown in FIG. 1 was used for testing the inventive inks and coatings of this application as well as comparative inks, but it is understood that moulds with different dimensions and different processing variables could also be used. FIG. 2 illustrates the thermoforming process. The substrate (1) can be seen in FIG. 2a to soften under the heat from the IR lamps. After about 25 seconds the mould (2) comes from under the substrate and deforms it as shown in FIG. 2b, such that the altered substrate (3) conforms to the substrate molding pattern of the mould (2). After about 40 seconds the mould (2) is retracted and a jet of air (not shown) is applied to cool the substrate down after it has been thermoformed into the required shape (4) as shown in FIG. 2c.

Materials

Monofunctional Urethane Monomer:

The monofunctional urethane monomer is preferably a monofunctional urethane acrylate monomer. A preferred monofunctional urethane monomer for the ink or coating of the present invention is Monomer 1, described below (see Example 1).

Other monofunctional urethane acrylates that can be used are reaction products of aliphatic monofunctional isocyanates with hydroxy functional (meth)acrylates. Examples include methyl, ethyl, propyl and octyl isocyanate. In one embodiment, the ink or coating includes a monofunctional urethane acrylate which is the reaction product of an isocyanate and a hydroxyl functional acrylate. The isocyanate may, for example, be a monofunctional isocyanate.

Diisocyanates, such as difunctional cycloaliphatic isocyanates, can be used but one isocyanate is preferably reacted with a hydroxy functional (meth)acrylate and the other with a saturated monofunctional alcohol, such as ethanol. The monofunctional urethane acrylate may, for example, be the reaction product of reacting a difunctional isocyanate with one molar equivalent of a monofunctional alcohol and subsequently reacting the monoisocyanate product thus obtained with a hydroxyl-functional acrylate or a monofunctional epoxy acrylate. A suitable difunctional isocyanate is isophorone diisocyanate, as it contains both a primary and secondary isocyanate group exhibiting different reactivity. This difference in reactivity can be used to synthesise a monofunctional urethane acrylate and limit the formation of the diacrylate. Difunctional aromatic isocyanates such as toluene 2,4-diisocyanate (TDI), 4,4'-diphenyl methane diisocyanate (MDI), m-tetramethylxylene diisocyanate (m-TMXDI), naphthalene 1,5-diisocyanate (NDI) and p-phenylene diisocyanate (PPDI) may be used. Also suitable are aliphatic and cycloaliphatic isocyanates such as hexamethylene diisocyanate (HDI) and dicyclohexylmethane 4,4'-diisocyanate (HMDI). In one embodiment, the monofunctional urethane acrylate is a compound of the formula (I):

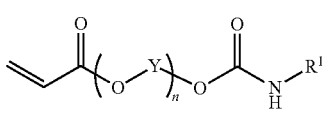

(I)

wherein $R^1$ is an aromatic or aliphatic group with the proviso that $R^1$ does not contain an acrylate functional group; Y is $C_1$-$C_5$ alkylene; and n is from 1 to 5. In one embodiment, n is 1 and Y is $C_1$-$C_5$ alkylene, $C_2$-$C_5$ alkylene or $C_2$-$C_4$ alkylene, for example ethylene. In a further embodiment, n is from 2 to 5 and Y is $C_1$-$C_5$ alkylene or $C_2$-$C_3$ alkylene, for example, ethylene. In a further embodiment, $R^1$ is selected from $C_1$-$C_{10}$ alkyl and

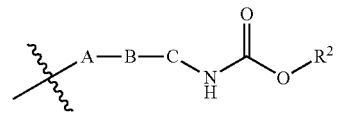

in which: A is selected from $C_6$-$C_{10}$ aryl, optionally substituted with $C_1$-$C_4$ alkyl, and $C_1$-$C_8$ alkyl; B and C are each independently selected from $C_6$-$C_{10}$ aryl, optionally substituted with $C_1$-$C_4$ alkyl, $C_1$-$C_8$ alkyl and bond; and $R^2$ is $C_1$-$C_{10}$ alkyl. In another embodiment, $R^1$ is selected from $C_2$-$C_6$ alkyl. For the avoidance of doubt, the term "alkylene" used herein refers to a divalent alkyl radical, such as methylene. In one embodiment, the term "alkylene" refers to a straight chain alkylene.

Further Monofunctional Monomers

Suitable monofunctional monomers include monofunctional acrylate monomers and monofunctional vinyl monomers. Examples of monofunctional acrylate monomers include 2-phenoxyethyl acrylate, isobornyl acrylate, tetrahydrofurfuryl acrylate, ethyl methacrylate, butyl methacrylate and methyl methacrylate. The ink or coating of the invention may include more than one further monofunctional monomer. Suitable monofunctional monomers for use in combination with the monofunctional urethane acrylates in the ink or coating of the invention include monofunctional epoxy acrylates, formed by the reaction of glycidyl (meth)acrylate with monofunctional saturated carboxylic acids. Suitable carboxylic acids include methanolic, ethanoic and propanoic acid.

Preferably, the further monofunctional monomers are selected such the ink or coating formulation has a low volatility as defined above. It has been found that when monomers are selected such that the ink or coating formulation has a low volatility a acceptable open time characteristics can be achieved, whereas when the monomers selected result in an ink or coating with a relatively high volatility, such as a weight loss of 8% or more especially about 10% or more when about a 10 g sample of said ink or coating is stood in a ventilated oven for about 4 hours at about 50° C. in an open flat bottomed dish having a diameter of about 55 mm, then the open time decreases.

The following is a partial list of monofunctional monomers having some or all of the above characteristics that are available from Sartomer Company Inc. and which are suitable for use in the invention:
SR256—2(2-ETHOXYETHOXY) ETHYL ACRYLATE
SR339—2-PHENOXYETHYL ACRYLATE
SR340—2-PHENOXYETHYL METHACRYLATE
CD421—3,3,5 TRIMETHYLCYCLOHEXYL METHACRYLATE
CD421A—3,3,5 TRIMETHYLCYCLOHEXYL METHACRYLATE
CD278—ACRYLATE ESTER
CD588—ACRYLATE ESTER
CD585—ACRYLIC ESTER
CD586—ACRYLIC ESTER
CD587—ACRYLIC ESTER
CD420—ACRYLIC MONOMER
CD9075—ALKOXYLATED LAURYL ACRYLATE
CD9087—ALKOXYLATED PHENOL ACRYLATE
CD9088—ALKOXYLATED PHENOL ACRYLATE
CD611—ALKOXYLATED TETRAHYDROFURFURYL ACRYLATE
SR313B—C12 C14 ALKYL METHACRYLATE
SR313D—C12 C14 ALKYL METHACRYLATE
SR495B—CAPROLACTONE ACRYLATE
SR531—CYCLIC TRIMETHYLOLPROPANE FORMAL ACRYLATE
CD535—DICYCLOPENTADIENYL METHACRYLATE
CD545—DIETHYLENE GLYCOL METHYL ETHER METHACRYLATE
SR504—ETHOXYLATED (4) NONYL PHENOL ACRYLATE
CD612—ETHOXYLATED (4) NONYL PHENOL METHACRYLATE
CD613—ETHOXYLATED NONYL PHENOL ACRYLATE
SR506A—ISOBORNYL ACRYLATE
SR423A—ISOBORNYL METHACRYLATE
SR395—ISODECYL ACRYLATE
SR242—ISODECYL METHACRYLATE
SR440—ISOOCTYL ACRYLATE
SR440A—ISOOCTYL ACRYLATE
SR335—LAURYL ACRYLATE
SR313A—LAURYL METHACRYLATE
SR709—METALLIC MONOMETHACRYLATE
CD551—METHOXY POLYETHYLENE GLYCOL (350) MONOACRYLATE
SR550—METHOXY POLYETHYLENE GLYCOL (350) MONOMETHACRYLATE
CD553—METHOXY POLYETHYLENE GLYCOL (550) MONOACRYLATE
CD552—METHOXY POLYETHYLENE GLYCOL (550) MONOMETHACRYLATE
SR484—OCTYLDECYL ACRYLATE
SR257—STEARYL ACRYLATE
SR324—STEARYL METHACRYLATE
SR285—TETRAHYDROFURFURYL ACRYLATE
SR203—TETRAHYDROFURFURYL METHACRYLATE
SR489D—TRIDECYL ACRYLATE
SR493D—TRIDECYL METHACRYLATE
CD730—TRIETHYLENE GLYCOL ETHYL ETHER METHACRYLATE Resins Examples of suitable vinyl resins include, but are not limited to the following: UCAR VYNS-3, VYHH, VYHD, VAGH, VAGD, VMCH, VMCC, VMCA, VAGF, VAGF, VAGC and VROH available from Dow; Solbin CN, CH, CL, A, AL, TA5R, M, ME, TA2, TA3, TAO and T available from Nissin; Vinnol H11/59, E15/45, H15/50, E15/48A and LL4320 available from Wacker; CK SP, UM55, UM50, UMOH, LPOH, UMCH45 and VAOH available from Wuxi Honghui; BD50, BDOH and BDCH available from Boading Zhongboa; Vinisol BD50, BDOH and BDCH available from Braschem; and TVRHD, TVRHH, TVRCC, TVRCH and TVRGH available from Tennants.

VROH is a hydroxyl functional terpolymer of vinyl chloride/vinyl acetate/hydroxy ethyl acrylate. Hydroxyl value is about 65 mgKOH/g and the molecular weight 15000.

VAGC is a terpolymer of vinyl chloride/vinyl acetate/ hydroxy ethyl acrylate. The hydroxyl value is similar to VROH but the molecular weight is higher at 24000.

VAGF is a terpolymer of vinyl chloride/vinyl acetate/ hydroxylethyl acrylate but manufactured to a molecular weight of about 33000.

VMCA is a carboxy functional terpolymer made from vinyl chloride/vinyl acetate/maleic acid. Acid value is about 20 mgKOH/g and molecular weight 15000.

VYHH is a vinyl chloride/vinyl acetate copolymer. Molecular weight is about 27000.

VYHD is a vinyl chloride/vinyl acetate copolymer with molecular weight 22000.

The vinyl resin preferably has a weight average molecular weight of less than 35000, especially less than 25000, for example less than 20000. The vinyl resin advantageously has an acid value of from 10 to 80 mgKOH/g, for example, from 15 to 70 mgKOH/g.

Photoinitiators

The radiation curable ink or coating compositions may, optionally, also contain a polymerization initiator. Various photoinitiators are known in the art and may be selected based on the type of colorant present (if any) and the radiation wavelength used to cure the ink or coating. A blend of photoinitiators can be used, having peak energy absorption levels at varying wavelengths within the range of the selected radiation for cure. Preferably, the photoinitiator and photoinitiator blends are sensitive to the wavelengths not absorbed, or only partially affected, by the pigment and/or dye colorant. Examples of suitable photoinitiators include 2-benzyl-2-(dimethylamino)-4'-morpholinobutyrophenone; 2-hydroxy-2-methylpropiophenone; trimethylbenzophenone; methylbenzophenone; 1-hydroxycyclohexylphenyl ketone; isopropyl thioxanthone; 2,2-dimethyl-2-hydroxy-acetophenone; 2,2-dimethoxy-2-phenylacetophenone; 2-methyl-1-[4-(methylthio)phenyl]-2-morpholino-propan-1-one; 2,4,6-trimethylbenzyl-diphenyl-phosphine oxide; 1-chloro-4-propoxythioxanthone; benzophenone; bis(2,6-dimethoxybenzoyl)-2,4,4-trimethyl pentyl phosphine oxide; 1-phenyl-2-hydroxy-2-methyl propanone; bis(2,4,6-trimethylbenzoyl)phenylphosphine oxide; camphorquinone; and the like. Combinations comprising one or more the foregoing may also be used. Suitable commercially available photoinitiators include, but are not limited to Irgacure 907, Irgacure 819, Irgacure 2959, Irgacure 184, Irgacure 369, Irgacure 379, Irgacure 651 and Darocur D1173, commercially available from Ciba Specialty Chemicals ("Ciba") benzophenone, Genocure LBP, commercially available from Rahn, ITX SarCure SR1124 and TZT SarCure SR1137, commercially available from Sartomer, Chivacure BMS, commercially available from Chitec Technology Co., and combinations thereof.

Pigments/Dyes

Suitable colorants include, but are not limited to, dyes, organic or inorganic pigments. The dyes include but are not limited to azo dyes, anthraquinone dyes, xanthene dyes, azine dyes, combinations thereof and the like. Organic pigments may be one pigment or a combination of pigments, such as for instance Pigment Yellow Numbers 12, 13, 14, 17, 74, 83; Pigment Red Numbers 2, 22, 23, 48:1, 48:2, 52, 53, 57:1, 122, 166, 170, 266; Pigment Orange Numbers 5, 16, 34, 36; Pigment Blue Numbers 15, 15:3, 15:4; Pigment Violet Numbers 3, 23, 27; and/or Pigment Green Number 7. Inorganic pigments may be one of the following non-limiting pigments: iron oxides, titanium dioxides, chromium oxides, ferric ammonium ferrocyanides, ferric oxide blacks, Pigment Black Number 7 and/or Pigment White Numbers 6 and 7. Other organic and inorganic pigments and dyes can also be employed, as well as combinations that achieve the colours desired.

Additives

As with many printing inks and coatings, other additives, alone or in combination may be employed, including but not limited to, ammonia, defoamers, stabilizers, silicones, plasticizers and the like.

Stabilizers

Stabilizers, also referred to in the art as "inhibitors", may be added to the formulation to stabilizers the ink or coating and prolong the storage time. Stabilizers typically inhibit radical formation thus preventing viscosity increase and gelation of the ink or coating with time. These are typically added at levels up to about 5 wt %, for example, from about 0.1 to about 3 wt %. In one embodiment the ink or coating includes stabilizers at a level of between 0.01 to 2 wt %. Examples of typical stabilizer materials used are 4-methoxyphenol, hydroquinone and butylated hydroxyl toluene from Sigma-Aldrich, Genorad 16 from Rahn and Irgastab 10 and 22 available from Ciba.

EXAMPLES

The following non-limiting examples illustrate the invention.

Monomer 1

276.3 g of butyl isocyanate, 0.06 g methylether hydroquinone and 0.05 g dibutyltin dilaurate was charged to a reaction flask fitted with a condenser, air sparge, temperature probe and a premix addition port. The temperature was raised to 60° C. and 323.7 g of hydroxyethyl acrylate added at an even rate over 5 hours. The vessel was then held at 80° C. until the isocyanate content was less than 100 ppm. The product was then cooled and the viscosity at 20° C. found to be 31.9 cps as measured using a Brookfield DV-II+ Pro viscometer at 100 revolutions per minute (RPM) using spindle 18.

Pigment Dispersions

TABLE 1

| Sunjet Black Pigment Dispersion | | |
| --- | --- | --- |
| Material | Type | Amount |
| Special Black 250 Fluffy (Evonink) | Black Pigment | 105 |
| Solsperse 35000 (Lubrizol) | Dispersant | 45 |
| PHEA (Sartomer) | Monomer | 149.4 |
| Butylhydroxy toluene (Aldrich) | Inhibitor | 0.3 |
| Methylether hydroquinone (Aldrich) | Inhibitor | 0.3 |

149.4 g PHEA, 45 g Solsperse 35000, 0.3 g butylhydroxy toluene and 0.3 g methylether hydroquinone was charged to a 1 liter mixing vessel and stirred under high speed stirring for 10 minutes. 105 g of special black 250 was added with stirring over 40 minutes. The mixture was then dispersed until the D50 was <200 nm on a Dispermat SL available from VMA Getzmann GmbH.

In order to produce the other Sunjet pigment dispersions listed in Table 4, the Special Black 250 from Table 1 was replaced with the following pigments on a wt by wt basis:

Cromophtal Yellow LA2 (Ciba)—to produce Sunjet Yellow dispersion

Fastogen Super Magenta RG (DIC)—to produce Sunjet Magenta dispersion

Fastogen Blue TGR (DIC)—to produce Sunjet Cyan dispersion

Resin 1

200 g of Vinylite VROH, a vinyl terpolymer available from Union Carbide was dissolved in 800 g isobornylacrylate by high speed stirring for 45 minutes. This was filtered through a 1 micron filter and allowed to cool.

Example 1

Examples 2-5

Examples 2 to 5 include Monomer 1 in combination with Resin 1. The addition of Resin 1 improves the percent stretch without compromising other performance properties.

TABLE 4

Formulations for Examples E2-5

| Material | E2 | E3 | E4 | E5 |
|---|---|---|---|---|
| Isobornylacrylate (IBOA) | 18.5 | 12.43 | 12.03 | 12.03 |
| Vinylcaprolactam | 24.9 | 24.9 | 24.9 | 24.9 |
| Monomer 1 | 22.43 | 31.9 | 32.6 | 32.9 |
| Resin 1 (formulation above) | 8 | 10 | 12 | 12 |
| 2.4-Diethylthioxanthone (DETX) | 2 | 2 | 2 | 2 |
| 2,4,6-Trimethyylbenzoyl-diphenyl phosphine oxide | 4.9 | 4.9 | 4.9 | 4.9 |
| Bis Acyl Phosphine | 2.6 | 2.6 | 2.6 | 2.6 |
| Butylhydroxy toluene | 0.34 | 0.34 | 0.34 | 0.34 |
| Methylether hydroquinone | 0.03 | 0.03 | 0.03 | 0.03 |

TABLE 2

Formulation of Example 1 plus comparative Examples 2-9

| Material | Type | E1 | C2 | C3 | C4 | C5 | C6 | C7 | C8 | C9 |
|---|---|---|---|---|---|---|---|---|---|---|
| Isobornylacrylate (IBOA) (Sartomer) | Monomer | 24.7 | 24.7 | 24.7 | 24.7 | 24.7 | 24.7 | 24.7 | 24.7 | 24.7 |
| Vinylcaprolactam (BASF) | Monomer | 24 | 24 | 24 | 24 | 24 | 24 | 24 | 24 | 24 |
| Monomer 1 | Monomer | 30 | — | — | — | — | — | — | — | — |
| Lauryl acrylate (Polymer Technologies) | Monomer | — | 30 | — | — | — | — | — | — | — |
| 3,3,5-Trimethyl Cyclohexane Acrylate (TMCHA) (Polymer Technologies) | Monomer | — | — | 30 | — | — | — | — | — | — |
| 2,(2-ethoxyethoxy)ethyl acrylate (Sartomer) | Monomer | — | — | — | 30 | — | — | — | — | — |
| Diethylene glycol butyl ether acrylate (Sartomer) | Monomer | — | — | — | — | 30 | — | — | — | — |
| Vinyl imidazole (BASF) | Monomer | — | — | — | — | — | 30 | — | — | — |
| n-Acryloyloxyethyl hexahydrophthalimide (DKSH) | Monomer | — | — | — | — | — | — | 30 | — | — |
| Vinyl acetate[9] (Sartomer) | Monomer | — | — | — | — | — | — | — | 30 | — |
| Phenyl 2-ethoxy acrylate (RAHN) | Monomer | — | — | — | — | — | — | — | — | 30 |
| 2.4-Diethylthioxanthone (DETX) (Ciba) | Photoinitiator | 3 | 3 | 3 | 3 | 3 | 3 | 3 | 3 | 3 |
| 2,4,6-Trimethyylbenzoyl-diphenyl phosphine oxide (BASF) | Photoinitiator | 4.9 | 4.9 | 4.9 | 4.9 | 4.9 | 4.9 | 4.9 | 4.9 | 4.9 |
| Bis Acyl Phosphine (Ciba) | Photoinitiator | 2.6 | 2.6 | 2.6 | 2.6 | 2.6 | 2.6 | 2.6 | 2.6 | 2.6 |
| Butylhydroxy toluene (Aldrich) | Inhibitor | 0.2 | 0.2 | 0.2 | 0.2 | 0.2 | 0.2 | 0.2 | 0.2 | 0.2 |
| Methylether hydroquinone (Aldrich) | Inhibitor | 0.1 | 0.1 | 0.1 | 0.1 | 0.1 | 0.1 | 0.1 | 0.1 | 0.1 |
| Actilane 800 (Ciba) | Surfactant/Flow Aid | 0.5 | 0.5 | 0.5 | 0.5 | 0.5 | 0.5 | 0.5 | 0.5 | 0.5 |
| Black pigment dispersion (see formula Below) (Sunjet) | Pigment Dispersion | 10 | 10 | 10 | 10 | 10 | 10 | 10 | 10 | 10 |
| Total | — | 100 | 100 | 100 | 100 | 100 | 100 | 100 | 100 | 100 |

TABLE 3

Test Results for Example 1 (E1) and Comparative Examples (C2-C9)

| Test | E1 | C2 | C3 | C4 | C5 | C6 | C7 | C8 | C9 |
|---|---|---|---|---|---|---|---|---|---|
| % stretch 200 mJ/cm$^2$* | 400 Pass | 420 Pass | 450 Pass | 90 Fail | 250 Pass | 450 Pass | 200 Fail | 70 Fail | 120 Fail |
| Surface hardness 100 mJ/cm$^2$ | Pass | Pass | Pass | NA | Fail | Fail | NA | NA | NA |
| Open time | Pass | Fail | Fail | NA | NA | NA | NA | NA | NA |
| Sustainability | Pass | Fail | Fail | NA | NA | NA | NA | NA | NA |

*% Stretch: <250% is a fail. No further tests were done on inks which failed the stretch test.

TABLE 4-continued

Formulations for Examples E2-5

| Material | E2 | E3 | E4 | E5 |
|---|---|---|---|---|
| Actilane 800 | 0.5 | 0.5 | 0.5 | 0.5 |
| Sunjet Magenta dispersion (formulation beneath Table 1) | 15.8 | — | — | — |
| Sunjet Yellow dispersion (formulation beneath Table 1) | — | 10.4 | — | — |
| Sunjet Cyan dispersion (formulation beneath Table 1) | — | — | 8.1 | — |
| Sunjet Black dispersion (Table 1) | — | — | — | 7.8 |
| Total | 100 | 100 | 100 | 100 |

TABLE 5

Test Results for Examples E2-5

| Test | E2 | E3 | E4 | E5 |
|---|---|---|---|---|
| % stretch 200 mJ/cm$^2$ | >500% Pass | >500% Pass | >500% Pass | >500% Pass |
| Surface hardness 100 mJ/cm$^2$ | Pass | Pass | Pass | Pass |
| Open time | Pass | Pass | Pass | Pass |
| Sustainability | Pass | Pass | Pass | Pass |
| *Viscosity @ 50° C. | 13.5 cps | 13.1 cps | 13.4 cps | 13 cps |

*Viscosity measured using a Brookfield DV-II+ Pro viscometer at 100 RPM using spindle 18.

TABLE 6

Formulations for Example E6 plus Comparative Examples C10-C18

| Material | Type | E6 | C10 | C11 | C12 | C13 | C14 | C15 | C16 | C17 | C18 |
|---|---|---|---|---|---|---|---|---|---|---|---|
| Isobornylacrylate (IBOA) | Monomer | 12 | 11 | 10 | 9 | 11 | 10 | 9 | 11 | 10 | 9 |
| Vinylcaprolactam | Monomer | 24.9 | 24.9 | 24.9 | 24.9 | 24.9 | 24.9 | 24.9 | 24.9 | 24.9 | 24.9 |
| Monomer 1 | Monomer | 33 | 33 | 33 | 33 | 33 | 33 | 33 | 33 | 33 | 33 |
| Resin 1 | Resin | 12 | 12 | 12 | 12 | 12 | 12 | 12 | 12 | 12 | 12 |
| 2.4-Diethylthioxanthone (DETX) | Photoinitiator | 2 | 2 | 2 | 2 | 2 | 2 | 2 | 2 | 2 | 2 |
| 2,4,6-Trimethyylbenzoyl-diphenyl phosphine oxide | Photoinitiator | 4.9 | 4.9 | 4.9 | 4.9 | 4.9 | 4.9 | 4.9 | 4.9 | 4.9 | 4.9 |
| Bis Acyl Phosphine | Photoinitiator | 2.6 | 2.6 | 2.6 | 2.6 | 2.6 | 2.6 | 2.6 | 2.6 | 2.6 | 2.6 |
| Butylhydroxy toluene | Inhibitor | 0.17 | 0.17 | 0.17 | 0.17 | 0.17 | 0.17 | 0.17 | 0.17 | 0.17 | 0.17 |
| Methylether hydroquinone | Inhibitor | 0.03 | 0.03 | 0.03 | 0.03 | 0.03 | 0.03 | 0.03 | 0.03 | 0.03 | 0.03 |
| Actilane 800 | Surfactant/Flow Aid | 0.3 | 0.3 | 0.3 | 0.3 | 0.3 | 0.3 | 0.3 | 0.3 | 0.3 | 0.3 |
| Dipropyleneglycol diacrylate (DPGDA Sartomer SR508) | Monomer | — | 1 | 2 | 3 | — | — | — | — | — | — |
| Tripropyleneglycol diacrylate (TPGDA Sartomer SR306) | Monomer | — | — | — | — | 1 | 2 | 3 | — | — | — |
| Propoxylated(2)neopentyglycol diacrylate (PONPGDA Sartomer SR9003) | Monomer | — | — | — | — | — | — | — | 1 | 2 | 3 |
| Sunjet Cyan dispersion | Pigment Dispersion | 8.1 | 8.1 | 8.1 | 8.1 | 8.1 | 8.1 | 8.1 | 8.1 | 8.1 | 8.1 |
| Total | | 100 | 100 | 100 | 100 | 100 | 100 | 100 | 100 | 100 | 100 |

TABLE 7

Test Results for Example E6 and Comparative Examples C10-C18

| Test | E6 | C10 | C11 | C12 | C13 | C14 | C15 | C16 | C17 | C18 |
|---|---|---|---|---|---|---|---|---|---|---|
| % stretch 200 mJ/cm$^2$ | >500% Pass | 95% Fail | 60% Fail | 48% Fail | 112% Fail | 94% Fail | 66% Fail | 84% Fail | 52% Fail | 40% Fail |
| Surface hardness 100 mJ/cm$^2$ | Pass | Pass | Pass | Pass | Pass | Pass | Pass | Pass | Pass | Pass |
| Open time | Pass | Pass | Pass | Pass | Pass | Pass | Pass | Pass | Pass | Pass |
| Sustainability | Pass | Pass | Pass | Pass | Pass | Pass | Pass | Pass | Pass | Pass |
| Viscosity @ 50° C. | 13.5 cps | 13.6 cps | 13.8 cps | 13.9 cps | 13.5 cps | 13.6 cps | 13.6 cps | 13.7 cps | 13.8 cps | 14.0 cps |

The results in Table 7 show that very low levels of multifunctional acrylates will cause a big reduction in the % stretch and render the ink unsuitable for a thermoforming application.

TABLE 8

Formulations for Comparative Examples C19-27

| Material | Type | C19 | C20 | C21 | C22 | C23 | C24 | C25 | C26 | C27 |
|---|---|---|---|---|---|---|---|---|---|---|
| Isobornylacrylate (IBOA) | Monomer | 12 | 12 | 8 | 12 | 12 | 8 | 12 | 10 | 2 |
| Vinylcaprolactam | Monomer | 24.9 | 24.9 | 24.9 | 24.9 | 24.9 | 24.9 | 24.9 | 24.9 | 24.9 |
| Monomer 1 | Monomer | 33 | 33 | 33 | 33 | 33 | 33 | 33 | 33 | 33 |
| Resin 1 | Resin | 10 | 6 | 12 | 10 | 6 | 12 | 10 | 6 | 12 |
| 2.4-Diethylthioxanthone (DETX) | Photoinitiator | 2 | 2 | 2 | 2 | 2 | 2 | 2 | 2 | 2 |
| 2,4,6-Trimethyylbenzoyl-diphenyl phosphine oxide | Photoinitiator | 4.9 | 4.9 | 4.9 | 4.9 | 4.9 | 4.9 | 4.9 | 4.9 | 4.9 |
| Bis Acyl Phosphine | Photoinitiator | 2.6 | 2.6 | 2.6 | 2.6 | 2.6 | 2.6 | 2.6 | 2.6 | 2.6 |
| Butylhydroxy toluene | Inhibitor | 0.17 | 0.17 | 0.17 | 0.17 | 0.17 | 0.17 | 0.17 | 0.17 | 0.17 |
| Methylether hydroquinone | Inhibitor | 0.03 | 0.03 | 0.03 | 0.03 | 0.03 | 0.03 | 0.03 | 0.03 | 0.03 |
| Actilane 800 | Surfactant/Flow Aid | 0.3 | 0.3 | 0.3 | 0.3 | 0.3 | 0.3 | 0.3 | 0.3 | 0.3 |
| Craynor 965[1] | Monomer | 2 | 6 | 4 | — | — | — | — | 2 | 6 |
| Craynor 966H90[2] | Monomer | — | — | — | 2 | 6 | 4 | — | — | — |
| Craynor 9170SA50[3] | Monomer | — | — | — | — | — | — | 2 | 6 | 4 |
| Sunjet Cyan dispersion | Pigment Dispersion | 8.1 | 8.1 | 8.1 | 8.1 | 8.1 | 8.1 | 8.1 | 8.1 | 8.1 |
| Total | | 100 | 100 | 100 | 100 | 100 | 100 | 100 | 100 | 100 |

[1]Craynor 965 is an aliphatic urethane diacrylate available from Sartomer
[2]Craynor 966H90 is an aliphatic urethane diacrylate in 10% 2-ethoxyethoxy ethylacrylate available from Sartomer
[3]Craynor 9170SA50 is an aromatic urethane diacrylate supplied in 50% of a phosphate ester available from Sartomer

TABLE 9

Test Results for Examples E6 and C19-27

| Test | E6 | C19 | C20 | C21 | C22 | C23 | C24 | C25 | C26 | C27 |
|---|---|---|---|---|---|---|---|---|---|---|
| % stretch | >500% | 102% | 114% | 95% | 110% | 105% | 92% | 97% | 62% | 80% |
| 200 mJ/cm$^2$ | Pass | Fail | Fail | Fail | Fail | Fail | Fail | Fail | Fail | Fail |
| Surface hardness 100 mJ/cm$^2$ | Pass | Pass | Pass | Pass | Pass | Pass | Pass | Pass | Pass | Pass |
| Open time | Pass | Pass | Pass | Pass | Pass | Pass | Pass | Pass | Pass | Pass |
| Sustainability | Pass | Pass | Pass | Pass | Pass | Pass | Pass | Pass | Pass | Pass |
| Viscosity @ 50° C. | 13.5 cps | 15 cps | 18 cps | 21.3 cps | 14.5 cps | 17.1 cps | 20.8 cps | 16.8 cps | 17.8 cps | 21 cps |

The results in Table 9 show that low levels of difunctional urethane Monomers will cause a big reduction in the % stretch and are unsuitable for use in thermoforming applications.

Test Methods

Surface Hardness/Offset Test
  Draw down ink to be tested onto ABS plastic (supplied by Amari Plastics PLC) with a 12 micron drawdown bar
  Cure on Fusion UV rig with 100 mJ/cm$^2$)
  Place clean ABS plastic substrate onto surface of cured ink.
  Place 3"×3" (76 mm×76 mm) square of rough substrate onto drawdowns to spread the weight.
  Place 1 kg weight onto rough substrate.
  Leave for measured amount of time e.g. 1 hour before separating 2 pieces of substrate.
  Check 'clean' substrate for ink transferred from drawdown. If ink has transferred then the ink has failed the test
% Stretch—This test is used to determine the % elongation
  Equipment
    1.5 mm ABS plastic substrate
    Fusion F300S curing lamp and LC 6E Laboratory Conveyor Rig
    Medium Pressure Mercury Bulb
    12 um Drawdown Bar
    RK 101 Automatic Drawdown Rig
    IL 390C Lightbug from International Light
    Infra red heater
    2 clamp stands
    3 additional clamps with cross style joining clamp
    Thermometer to over 120° C.
    2 bulldog clips
    Heat resistant glove
  Test Procedure
    Drawdown a 12 um film of the ink in question on a piece of ABS plastic substrate.
    Cured using a Fusion F300 unit which is 120 W/cm and an undoped mercury (H-bulb) spectrum. Energy level was measured at 150 mJ/cm$^2$.
    Cut a strip from this drawdown 1 cm×7 cm long.
    Place strip between bulldog clips with 5 cm gap between clips.
    Set up infra red heater approx 12 cm above bench level using 2 clamp stands.
    Attach 1 of the additional clamps to 1 of the clamp stand uprights so the clamp is under the heater, as close as possible to bench level.

Join remaining 2 clamps together with cross style clamp.

Place bulldog clips into jaws of fixed clamp and 1 end of the joined clamp (to be held by hand).

Place thermometer under heater close to strip of substrate.

Put on heat resistant glove and hold the end of the joined clamps.

Turn on heater to 2 bars and wait until temperature reaches chosen heat for the substrate (around 100° C.).

Pull with even pressure until 'white break' appears.

Record result as equation below.

Formula to determine % Elongation $$[(\text{Length at which white lines seen (cm)} - \text{original length})/\text{Original length}] \times 100 = \% \text{ Elongation}.$$

Note: Original length is 5 cm.

Pass/Fail Criteria:
>250% elongation is a pass.
<250% elongation is a fail.

Sustainability

This is the ability of the ink or coating to run without losing any jets. Poor sustainability can occur due to monomer loss at the nozzle, passive resin blocking nozzles or due to incorrect face plate wetting. The number of jets lost over a given time governs if the ink or coating passes or fails. >4 lost is a fail.

Background—A basic jettability evaluation is performed on a Spectra print head by firstly assessing the drop mass ejected from the nozzles as a function of pulse width, fire frequency and voltage. Secondly the jetting sustainability is examined at optimum drop mass settings for periods up to 15 minutes.

Apparatus

Spectra print head and reservoir assembly—see Spectra manual for details.

Spectra Apollo kit and web drive system.

Disposable weighing boats.

General purpose web paper (3" width-76 mm)

High quality web paper (3" width-76 mm)

Fusion laboratory UV curing unit (mercury vapor bulb), set at ~250 ml/cm$^2$.

Around 500 mL ink sample will be required for testing.

Guardline WW-3009 cleanroom wipes.

Supporting Documentation

Spectra Apollo PSK manual

Guidelines for print head flushing—use appropriate procedure for ink being tested.

Spectra document—'finding the LOIS set point'—copy in the PSK manual.

Final Acceptance Test (FAT) printout—retained in the PSK manual; refer to the print head or jetting assembly number.

Procedure

Start up

Affix Spectra print head/reservoir assembly to the web drive unit using two hex drive bolts. Ensure face plate is parallel to the web and is at 90° to the direction of travel. For the drop mass evaluation, the distance between the faceplate and the paper should be ~2 mm.

Ensure the print head is electrically and pneumatically connected to the Apollo control unit. Make sure that the print head is flushed and purged of any previous ink or coating or flush solvent using the appropriate procedure. The ink or coating feed should then be connected to the top of the reservoir; this line should be fitted with a 10 μm disc filter to reduce the possibility of contamination and the feed line should then be passed through the peristaltic pump and into the sample container.

Start up the Apollo control system on the computer (TK display icon) and ensure the jetting temperature is set at 47° C.±1 as required.

Once the LOIS level is set and the reservoir is up to temperature, move the print head over the catch tray and perform a long purge, then wipe the nozzle plate using a cleanroom wipe. Check all nozzles are working correctly by setting a fire voltage of 100 V for all arrays and a pulse width of 8 μs. Set the fire frequency control to 'external', then perform a 'print test pattern'. Ensure the print head is mounted directly over the paper web and start the web drive at a low speed (about 1.0 on the 'coarse' dial). Check that all nozzles are firing. If not, perform the purge/wipe/print cycle a few more times.

Determining sustainability

Once the optimum settings are determined for obtaining the correct drop mass for a particular print head/ink or coating system, these data can be used to carry out sustainability tests.

Starting at 4 kHz and 6 μs pulse width, input the fire voltage found to give the optimum drop mass. Ensure all jets are set to 'ON' in the 'Jet Pattern' tab and # copies is set to 'continuous'. Fit the high quality paper into the web drive unit and then move the print head over the paper. Set the web drive speed to 1.0 (~4 kHz), then click on 'print jet pattern'. After ~7 seconds turn the web drive on so that a number of blocks are printed. Turn the web drive off and carefully move the (still printing) head over the catch tray. Cut a sample of the print and cure it as quickly as possible. Tape the cut sections together and feed this part past the print head.

This process (print/cut/cure/etc) can now be repeated at five minute intervals up to 15 minutes. Note any missing or misaligned jets.

The entire sustainability test can also be repeated at different pulse widths or fire frequencies. If the fire frequency is changed, increase the web speed as follows:

4 kHz=1.0.
8 kHz=2.0.
12 kHz=3.0.
16 kHz=4.0.
20 kHz-run at 4.5.

Pass/Fail Criteria

If >4 jets are lost over fifteen minutes then the ink or coating has failed the sustainability test.

Note: Spectra quote the range for optimum drop mass to be within ±15% of the H.A.D.M. voltage.

Open Time

The open time is how long the ink or coating can be left unattended and still perform acceptably upon restarting.

Procedure

Examine print for any missing or misaligned jets.

Leave at jetting temperature for required length of time (e.g. 40 min.)

Perform test print and compare missing and misaligned jets along with any lag before jetting begins.

Pass/Fail Criteria
  A fail is when jets are lost or when the jetting is retarded with a delayed start up.
  A pass is the absence of lost jets or jetting is not retarded with a delayed start up.

Determination of Ink or Coating Volatility

Advantageously, the inks or coatings of the invention have a low volatility. A low viscosity ink or coating may, for example, be defined as an ink that has a weight loss of no more than about 5% in after standing in a ventilated oven for about 4 hours at about 50° C. in an open flat bottomed dish having a diameter of about 55 mm. The volatility of inks and coatings of the invention may be evaluated by determining the percentage weight loss as described below:

Apparatus:
  1. Flat-bottomed dish, tinplate or aluminium, (55±5) mm diameter, rim height at least 5 mm.
  2. Air oven thermostatically controlled to +2° C. (for temperatures up to 150° C.) or ±3.5° C. (for temperatures up to 200° C.). The air oven has a forced ventilation equipment providing an air speed within the range 0.8 ms$^{-1}$ to 1.2 ms$^{-1}$.
  3. Analytical balance, accurate to 0.1 mg.

Procedure:
Perform the test in duplicate.
  1. De-grease and clean the dish. Dry the dish in the oven.
  2. Weigh accurately the empty dish.
  3. Weigh accurately 10±0.1 g of the ink or coating sample into the dish. Make sure it is evenly distributed over the surface of the dish. A tared, bent metal wire is suitable for this purpose.
  4. Allow the dish with the sample to stand at room temperature for 10 to 15 minutes.
  5. Place the dish in the pre-heated air oven and leave for 4 hours at 50° C.
  6. Remove the dish from the oven and allow to cool, preferably in a desiccator.
  7. Re-weigh the dish plus residue and calculate the mass of the residue.

Calculation and Reporting:

% weight loss=$(W_1-W_2/W_1)*100$

Where:
  $W_1$ is the weight of sample before heating
  $W_2$ is the weight of residue after heating.

Calculate the mean. If the two results differ from the mean by more than 2% relative to the mean, repeat the procedure. Report the mean of the two valid results and report to the nearest 0.1% (m/m). Include the sample weight, test temperature and the period of heating.

The ink composition of Example E1 was found to have a weight loss of 4.5% whereas the ink composition of Comparative Example C3 had a weight loss of 13.1%. Without wishing to be bound by any theory, the relatively high volatility of Comparative Example C3 compared to that of Example E1 may explain the failure of C3 in the sustainability test (see Table 3 above).

The invention claimed is:

1. An energy-curable thermoforming ink or coating comprising a monofunctional urethane acrylate monomer, a multifunctional monomer, a further monofunctional monomer, and a vinyl resin, wherein the further monofunctional monomer is either a monofunctional acrylate monomer or a monofunctional vinyl monomer; wherein the level of multifunctional monomer present is less than about 1 wt %; wherein the level of monofunctional urethane monomer present is at least about 15 wt %; and wherein the monofunctional urethane acrylate monomer is the reaction product of an isocyanate and a hydroxyl functional acrylate or a monofunctional epoxy acrylate;

wherein the monofunctional urethane acrylate is a compound of the formula (I):

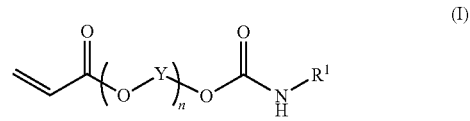

wherein
  $R^1$ is an aromatic or aliphatic group with the proviso that $R^1$ does not contain an acrylate functional group;
  Y is selected from $C_1$-$C_6$ alkyl and n is from 1 to 5.

2. The ink or coating of claim 1, wherein $R^1$ is selected from $C_1$-$C_{10}$ alkyl and

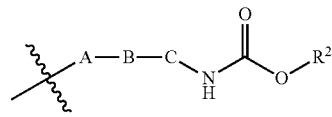

in which: A is selected from $C_6$-$C_{10}$ aryl, optionally substituted with $C_1$-$C_4$ alkyl, and $C_1$-$C_8$ alkyl; B and C are each independently selected from $C_6$-$C_{10}$ aryl, optionally substituted with $C_1$-$C_4$ alkyl, $C_1$-$C_8$ alkyl and bond; and $R^2$ is $C_1$-$C_{10}$ alkyl.

3. The ink or coating of claim 1, comprising a total of at least about 60 wt % monofunctional monomers.

4. The ink or coating of claim 1, further comprising a stabilizer.

5. The ink or coating of claim 1, wherein a cured layer of the ink or coating is capable of about a 300% extension without cracking.

6. The ink or coating of claim 1, wherein about a 10 g sample of ink or coating has a weight loss of no more than about 5% after standing in a ventilated oven for about 4 hours at about 50° C. in an open flat bottomed dish having a diameter of about 55 mm.

7. The ink or coating of claim 5, which comprises no more than 3 wt % solvent.

8. A method of producing a three-dimensional printed article comprising the steps of: a. applying the energy-curable thermoforming ink or coating of claim 1 onto a flat substrate; b. exposing the printed ink or coating to actinic radiation to form a cured film; c. heating the substrate to a temperature above the glass transition temperature to soften the substrate; d. deforming the substrate to produce a shaped article; and e. cooling the substrate to below the glass transition temperature.

9. The method of claim 8, wherein the ink or coating is applied by ink-jet printing.

10. A three-dimensional printed article comprising a cured layer of the energy-curable thermoforming ink or coating of claim 1.

11. The ink or coating of claim 1, wherein the level of multifunctional monomers present is less than about 0.5 wt %.

12. The ink or coating of claim 1, further comprising a free-radical photoinitiator.

13. The ink or coating of claim 1, further comprising from about 0.5 to about 10 wt % vinyl resin.

14. The ink or coating of claim 1, which comprises no more than 15 wt % vinyl resin.

15. The ink or coating of claim 1, wherein the ink or coating is an ink-jet ink coating.

16. The ink or coating of claim 1, having a viscosity of less than about 20 mPas at about 50° C.

17. The ink or coating of claim 1, further comprising a colorant.

* * * * *